United States Patent
Monzel

(10) Patent No.: US 8,072,100 B2
(45) Date of Patent: Dec. 6, 2011

(54) STATOR FOR AN ELECTRICAL MACHINE WITH LIQUID COOLING

(75) Inventor: Christoph Monzel, Bad Neustadt (DE)

(73) Assignee: Siemens Aktiengesellschaft, München (DE)

( * ) Notice: Subject to any disclaimer, the term of this patent is extended or adjusted under 35 U.S.C. 154(b) by 440 days.

(21) Appl. No.: 12/442,271

(22) PCT Filed: Sep. 20, 2007

(86) PCT No.: PCT/EP2007/059945
§ 371 (c)(1),
(2), (4) Date: Mar. 20, 2009

(87) PCT Pub. No.: WO2008/034864
PCT Pub. Date: Mar. 27, 2008

(65) Prior Publication Data
US 2010/0026111 A1    Feb. 4, 2010

(30) Foreign Application Priority Data
Sep. 22, 2006  (DE) .......................... 10 2006 044 963

(51) Int. Cl.
*H02K 9/19* (2006.01)
(52) U.S. Cl. ...................... 310/54; 310/64; 310/216.119
(58) Field of Classification Search ............... 310/52, 310/54, 58, 59, 64, 216.013, 216.056, 216.119, 310/179
See application file for complete search history.

(56) References Cited

U.S. PATENT DOCUMENTS

| | | | | |
|---|---|---|---|---|
| 1,882,487 A | * | 10/1932 | Dupont | 310/65 |
| 3,014,139 A | * | 12/1961 | Shildneck | 310/64 |
| 5,084,642 A | * | 1/1992 | Katsuzawa et al. | 310/54 |
| 6,822,352 B2 | * | 11/2004 | Nimz et al. | 310/58 |
| 2004/0012272 A1 | | 1/2004 | Houle et al. | |
| 2005/0067904 A1 | * | 3/2005 | Houle et al. | 310/54 |
| 2007/0152518 A1 | * | 7/2007 | Perrin | 310/54 |
| 2008/0252157 A1 | * | 10/2008 | Muller et al. | 310/64 |

FOREIGN PATENT DOCUMENTS

| | | | |
|---|---|---|---|
| DE | 22 38 562 A1 | | 2/1974 |
| DE | 31 30 515 A1 | | 6/1982 |
| DE | 3130515 A | * | 6/1982 |
| DE | 197 42 255 C1 | | 11/1998 |
| DE | 101 03 447 A1 | | 8/2002 |
| DE | 101 15 186 A1 | | 10/2002 |
| DE | 101 31 119 A1 | | 1/2003 |
| DE | 100 05 128 B4 | | 3/2004 |
| DE | 103 44 630 A1 | | 5/2005 |
| DE | 10 2004 052 070 A1 | | 5/2006 |
| EP | 48213 A1 | * | 3/1982 |
| EP | 72999 A1 | * | 3/1983 |
| FR | 513 509 A | | 2/1921 |
| JP | 55 114169 A | | 9/1980 |
| WO | WO 99/17422 A1 | | 4/1999 |

* cited by examiner

*Primary Examiner* — Quyen Leung
*Assistant Examiner* — Naishadh Desai
(74) *Attorney, Agent, or Firm* — Henry M. Feiereisen; Ursula B. Day

(57) ABSTRACT

The invention relates to a stator (2), in particular for a housing-less electrical machine (1), wherein substantially axially running cooling channels (3, 13) are located in the stator (2), into which channels cooling pipes (4, 6, 7) can be inserted and, at least in sections, means are provided which, by means of deformation of the cooling channels (3, 13), cause the cooling pipes (4, 6, 7) to be pressed against the cooling channel (3, 13) on the side facing the heat sources of the electrical machine (1); efficient liquid cooling is therefore provided.

11 Claims, 2 Drawing Sheets

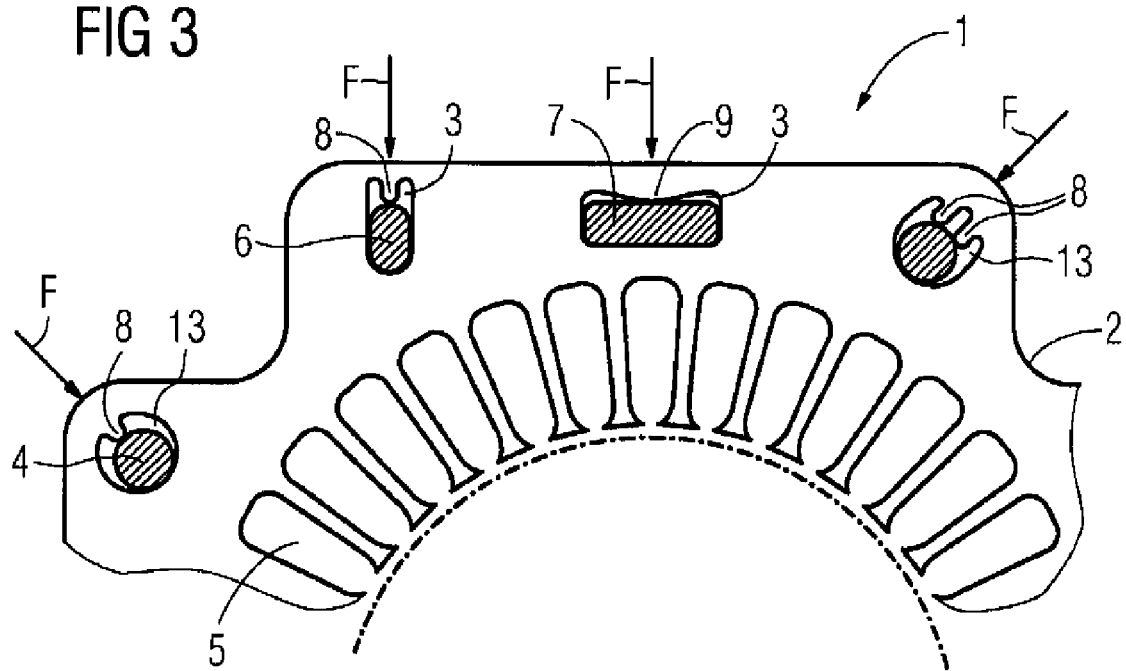
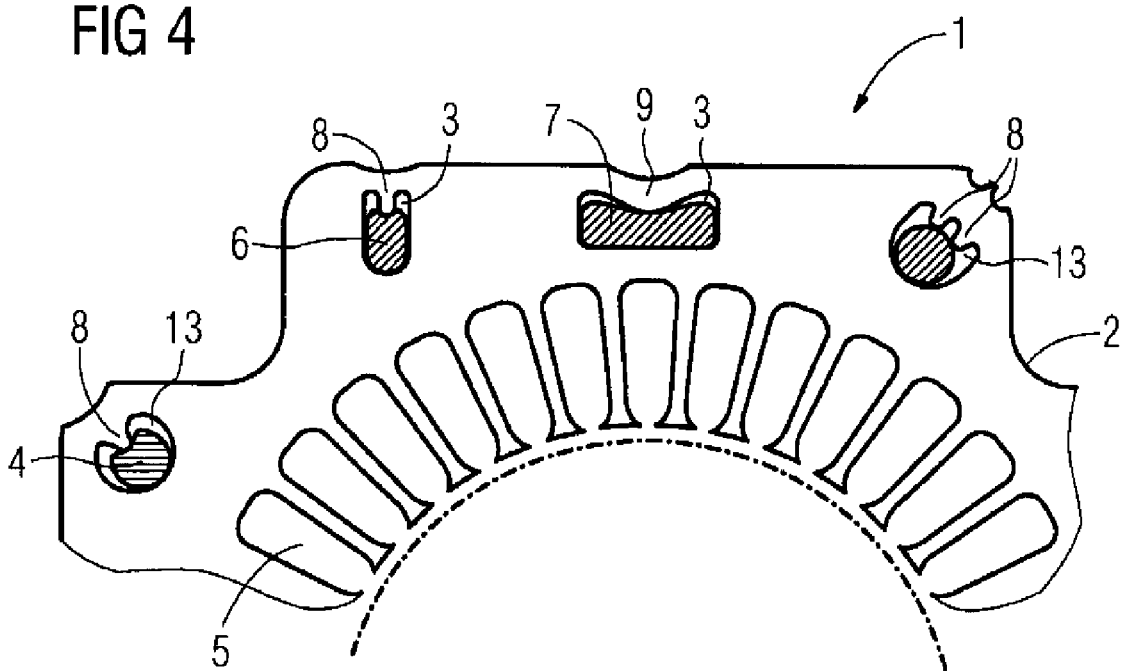

STATOR FOR AN ELECTRICAL MACHINE WITH LIQUID COOLING

CROSS-REFERENCES TO RELATED APPLICATIONS

This application is the U.S. National Stage of International Application No. PCT/EP2007/059945, filed Sep. 20, 2007, which designated the United States and has been published as International Publication No. WO 2008/034864 and which claims the priority of German Patent Application, Serial No. 10 2006 044 963.0, filed Sep. 22, 2006, pursuant to 35 U.S.C. 119(a)-(d).

BACKGROUND OF THE INVENTION

The invention relates to a stator in particular of a housing-less electrical machine with liquid cooling, and to a manufacturing process for such a stator arrangement.

It has long been known to cool electrical machines such as electric motors or generators with a gaseous or liquid medium. Air is preferably used as the gaseous medium and water as the liquid medium. In the case of air cooling, the electrical machines are self-ventilated or externally ventilated.

In the case of liquid cooling, water is typically used as the cooling medium, which is conducted through metallic pipes such as through copper or steel pipes, for example. These pipes can be laid in meandering fashion through the stator of the electrical machine. For this purpose, the respective cooling pipes are connected at both end sides of the electrical machine to deflecting devices, such as U pipes, for example, or to a deflecting chamber. Furthermore, a cooling water inlet and a cooling water outlet also need to be provided. The heated cooling water is supplied to a heat exchanger or a radiator, via which the majority of the waste heat of the electrical machine can be dissipated further to the surrounding environment.

The stator of an electrical machine is conventionally in laminated form in order to minimize the eddy current losses resulting during the excitation. For this purpose, the stator is in the form of a laminate stack comprising a large number of thin electrical steel laminations with an axial stacking order. In order to cool the electrical machine, corresponding cutouts, preferably in the form of punched-out portions, are provided primarily in the lamination section of a stator electrical steel lamination. Once the laminate stack has been assembled, axially running cooling channels are produced, through which, for example, air can be conducted for cooling purposes.

In the case of liquid cooling of the electrical machine, metal pipes can be provided which are fitted into the channels resulting from the punching-out process, wherein the diameter of the usually circular metal pipes is intended to be slightly smaller than the diameter of the corresponding circular punched-out portions in the electrical steel lamination. The aim of this is to produce good heat transfer between the laminate stack and the cooling liquid.

One disadvantage in this case is the considerable degree of complexity involved with installation in order to introduce the cooling pipes into the stator, primarily in the case of axially relatively long electrical machines.

Liquid cooling is preferably used when electrical machines are intended to be operated close to their power limit, i.e. the thermal power loss to be dissipated is comparatively high. The electrical connection power of such electrical machines is typically more than 5 kW. Liquid-cooled electrical machines are additionally quieter during operation since no fans are needed. On the other hand, the technical complexity involved for liquid cooling is much greater than for air cooling.

Different housings are used for the electrical machines depending on the type of cooling, with the cooling means being provided in the housings. In the case of electrical machines without a housing, both cooling types can also be provided by suitable lamination cutting of the electrical steel laminations. Thus, in the case of liquid cooling, cooling pipes with a preferably circular cross section can be inserted into corresponding channels in the laminate stack.

The disadvantage here is the fact that a large number of pipe connections is required in the case of liquid cooling in order to join the numerous cooling pipe ends tightly in terms of hydraulics. This can take place in the case of copper pipes, for example, by means of a soldered joint or screw connection. The manufacture of such a cooling device is correspondingly involved.

In order to cool a housing-less electrical machine with water, cooling pipes, heat pipes or cool jets need to be passed through the laminate stack of the stator since the laminate stack on its own does not produce a sufficient sealing effect. This deficient sealing effect can result in considerable operational faults, in particular in the direction of the winding system of the electrical machine. An air gap is thus produced between the cooling pipe and the laminate stack, which air gap impairs the thermal connection between the cooling pipe and the stator.

The possibility of reducing the air gap between the cooling pipe and the laminate stack of the stator can be performed either by axial press-in operations of the cooling pipes into the cooling channels of the stator or else by virtue of the fact that this air gap is filled with thermally conductive paste or by impregnating resin in order to improve the thermal connection.

For example, DE 197 42 255 C1 has disclosed a housing-less three-phase machine with axially parallel coolant pipes which are arranged in the stator laminate stack. Since these coolant pipes are designed to be rigid, difficulties can arise when they are pushed into bores of the stator laminate stack, primarily since there is intended to be a comparatively small air gap between the cooling pipe and the stator laminate stack.

DE 101 03447 A1 has disclosed a cooled stator for an electrical machine, in which a corrugated metal tube is arranged in the cooling channels in order to facilitate fitting.

US 2004/0012272 A1 has disclosed an electrical machine in which metal pipes are pressed into half-open cooling channels on that side of the laminate stack which faces away from the winding system.

These previously known solutions are either extremely complex in terms of manufacturing technology and/or are comparatively ineffective thermally.

SUMMARY OF THE INVENTION

Against this background, the invention is based on the object of providing a stator, in particular for a housing-less electrical machine, with which an efficient cooling device can be produced. A further object of the invention is to provide a sufficient thermal connection between cooling pipes and a cooling channel. Furthermore, the invention specifies a suitable manufacturing process for such a stator and an electrical machine.

The stated object is achieved by a stator, in particular for a housing-less electrical machine, wherein substantially axially running cooling channels are located in the stator, into which channels cooling pipes can be inserted and, at least in sections, means are provided which, by means of deformation of the cooling channels, cause the cooling pipes to be pressed against the cooling channel on the side facing the heat sources of the electrical machine.

The cooling pipes are pressed against the cooling channels of the stator using suitable means. In this case, this pressing is produced advantageously by external targeted action of force. Efficient heat transfer is required, in particular on that side of the cooling pipe which faces the heat source, but this heat transfer, owing to the fact that the pressing takes place at precisely this side, results in extremely efficient heat transfer and therefore in excellent heat dissipation. Those sections of the cooling pipes which face away from the heat source are pressed against the sections facing the heat source by suitable means of the laminate stack, in particular one or more humps or a dent. In this case, substantially the $I^2R$ losses of the winding, the core losses and the eddy current losses occur as the heat source.

That side of the cooling pipes which faces away from the heat source contributes to the dissipation of the heat even in the case of an effective thermal connection only to a comparatively small degree. Therefore, the at least punctiform contact between the laminate stack and the cooling pipe as a result of the humps, dents etc. is inconsiderable for the cooling efficiency of the cooling device. The laminate stack of the stator therefore does not need to bear against the cooling pipe in this section which faces away from the heat source. The cavities which may be provided in this section can be filled by thermally conductive paste or impregnating resin.

Such humps, knobs or dents on the individual laminations can be produced relatively easily by punching dies. In this case, the number of humps, dents or knobs per cooling channel is not restricted either in the circumferential direction or in the axial direction; it is only necessary for sufficient pressing of the cooling pipes to be produced in the region of the side facing the heat source.

As a result of the fact that the regions on the outer side of the stator are marked, it is now possible in a simple manner, by means of a suitable tool, to press these regions inwards and therefore to press the cooling pipe by means of the hump, knob or dent permanently against the cooling channel.

Advantageously, the cooling efficiency is further increased by an additional deformation of the cooling pipe by the cooling pipe being matched to the shape of the cooling channel. Thus, not only punctiform contact but even areal contact between the cooling pipe and the cooling channel is present.

This principle can of course also be transferred from laminated stators to sintered stators. Here, it is critical in each case that the cooling pipes located in the cooling channel are pressed against the cooling channel preferably on the side facing the heat source as a result of a deformation of at least the cooling channel.

In a further embodiment, the pressing also causes the cooling pipe to be deformed by means of the humps, knobs or dents, etc., and this deformation results in optimum matching of shape between the cooling channel and the cooling pipe.

Such stators are particularly suitable for all types of electrical machines, whether they be linear motors or rotary motors, irrespective of the way in which they are excited, which can take place electrically or by means of permanent magnets.

BRIEF DESCRIPTION OF THE DRAWING

The invention and further advantageous configurations of the invention will be explained in more detail with reference to schematically illustrated exemplary embodiments, in which:

FIGS. 3, 4 show a detail illustration of a stator, prior to and after the deformation of the cooling channels.

DETAILED DESCRIPTION OF PREFERRED EMBODIMENTS

Figure 1:
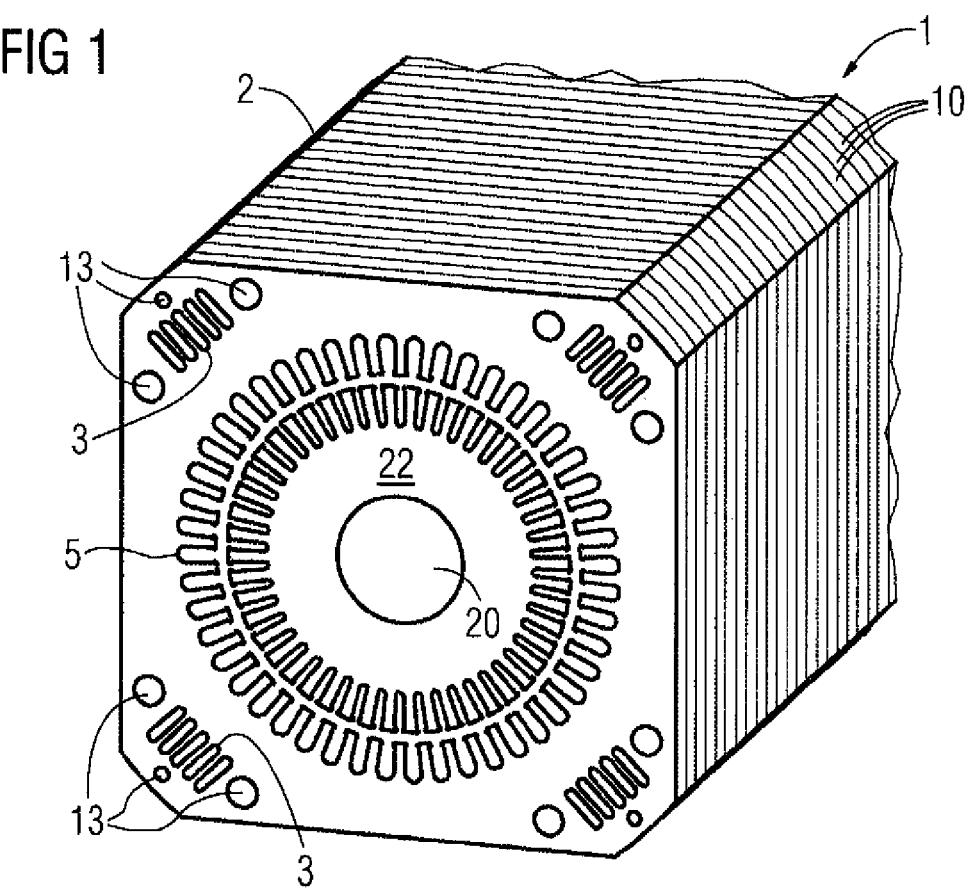
FIG. 1 shows a perspective illustration of a basic electric motor.

FIG. 1 shows an electrical machine 1, which is designed without a housing and which has a stator 2, which comprises individual laminations 10. The punched individual laminations 10 are stacked in such a way that punched-out portions, in particular cooling channels, which are in the form of round cooling channels 13 or in the form of oval cooling channels 3, arranged one behind the other in the stacking order, form axially running cooling channels.

A winding system, which is not illustrated in any more detail and which represents inter alia a critical heat source during operation of the electrical machine 1, is accommodated in slots 5. In this case, the winding system can comprise tooth-wound coils or a conventional fractional pitch winding system. Tooth-wound coils are in this case understood to mean coils which each surround only one tooth. Furthermore, the drawing shown in FIG. 1 shows in principle a laminated rotor 22, which has been shrunk onto a shaft 20.

Figure 2:
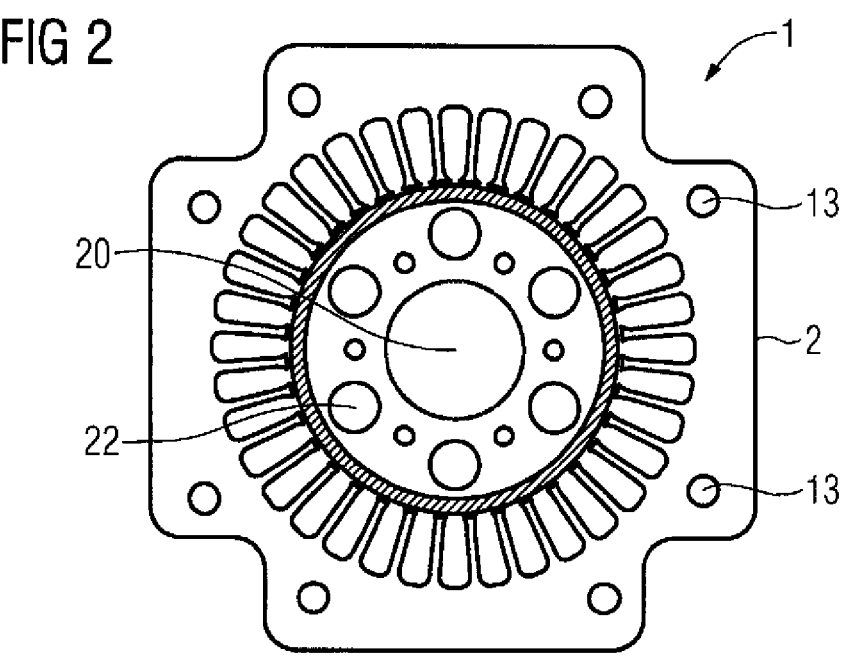
FIG. 2 shows a cross section through a further motor.

FIG. 2 shows, in a cross section, a further housing-less electrical machine with cooling channels 13, which are provided in the corners of the stator 2 and form a cooling device which is arranged substantially around the slots 5 of the stator 2. Furthermore, the FIG. shows a rotor 22, which has permanent magnets 11 on its surface, which permanent magnets are preferably positioned and fixed by means of binding and/or an adhesive joint on the rotor 22.

FIG. 3 shows a detail illustration of an electrical machine 1 with the design shown in FIG. 2 and with slots 5 and cooling channels 3, 13 provided in the corners and/or on the surface. These cooling channels 3, 13 have, in particular on the side facing away from the slots 5, i.e. the side facing away from the heat source, at least one hump 8, knob or dent 9, which, owing to the configuration of the electrical steel lamination of the stator 2, nevertheless allows effortless axial insertion of cooling pipes 4, 6 or 7. The cooling pipes 4, 6 or 7 can in this case have a very wide variety of cross-sectional shapes, as is illustrated in principle. Likewise, the cooling channels 3, 13 are not restricted in terms of their cross sectional shape.

As a result of an action of force F, as is illustrated in principle in FIG. 3, a force is now exerted on the hump 8 or the dents 9 inwards, with the result that, as is illustrated in FIG. 4, a deformation of the cooling channel 3, 13 is produced. As a result of this deformation of the cooling channel 3, 13 and possibly of that part of the cooling pipe 4, 6 and 7 which faces the hump 8, the cooling pipes 4, 6, 7 are pressed against that side of the stator 2 of the electrical machine 1 which faces the air gap.

Excellent heat transfer between the laminate stack of the stator 2 and the cooling pipes 4, 6, 7 located in the cooling channels 3, 13 is thus provided. This type of fixing, positioning and pressing of the cooling pipes 4, 6, 7 in the cooling channels 3, 13 is extremely advantageous, in particular since the heat transfer on that side of the cooling pipe which faces the heat source is the decisive factor for the quality of the heat removal.

In an advantageous configuration of the electrical machine 1, a cooling jacket, which runs in meandering fashion over the stator 2, is now formed by deflecting elements on the end sides of the stator 2.

However, the deflecting elements can also be in the form of deflecting chambers, with a deflecting chamber having at least one inlet and at least one outlet.

What is claimed is:

1. A stator for an electrical machine, comprising:
a laminate stack defining an axis and having formed therein cooling channels extending substantially in a direction of the axis;
a heat source;
cooling pipes inserted into the cooling channels; and
a force-applying means rendered effective through deformation of the laminate stack to press the cooling pipes in the cooling channels against a side which faces the heat source.

2. The stator of claim 1 for use in a housing-less electrical machine.

3. The stator of claim 1, wherein the force-applying means is a member selected from the group consisting of hump, knob or dent of the cooling channels.

4. The stator of claim 1, wherein the force-applying means is constructed to point in a direction of an air gap of the electrical machine so that the cooling pipes are pressed and/or deformed on a side facing the air gap when the cooling channels are deformed as a result of the deformation of the laminate stack.

5. The stator of claim 1, wherein the cooling channels have a cross-section of a shape selected from the group consisting of round, roundish, oval, and polygonal.

6. The stator of claim 1, wherein the cooling pipes have a configuration selected from the group consisting of round, roundish, and polygonal, and are sized to allow axial insertion thereof into the cooling channels without any deformation.

7. The stator of claim 1, further comprising markings formed on the laminate stack in an area of the force-applying means to mark a location where an action of force is to be applied for implementing the deformation of the cooling channels.

8. The stator of claim 1, further comprising a deflection means at opposite end sides of the laminate stack to cause a deflection of a cooling flow into the cooling pipes so that the coolant flow is conducted around the stator along a meandering path.

9. The stator of claim 8, wherein the deflection means includes at least one member selected from the group consisting of deflecting elements and end plates of the stator.

10. The stator of claim 8, wherein the cooling pipes are sized to protrude axially out of the laminate stack and compressible with the deflection means to thereby realize a sealed cooling circulation.

11. A process for the manufacture of a stator, comprising the steps of:
punching electrical steel laminations with a geometrical contour to define cooling channels formed with a hump, knob, or dent;
stacking the laminations in a way to align the cooling channels in an axial direction and to form a laminate stack;
axially inserting cooling pipes into the cooling channels of the laminate stack; and
applying a force on an outer side of the laminate stack to thereby press the cooling pipes against a side in the cooling channels in proximal relationship to a heat source.

* * * * *